Patented Nov. 15, 1949

2,488,485

UNITED STATES PATENT OFFICE 2,488,485

PREPARATION OF ANHYDROUS LITHIUM PEROXIDE

Paul F. Winternitz, New York, N. Y.

No Drawing. Application September 14, 1945, Serial No. 616,469

13 Claims. (Cl. 23—184)

This invention relates to the preparation of metal peroxides, and it has particular reference to the provision of a method whereby peroxides, such as lithium peroxide, may be prepared in an anhydrous form.

It is known from the literature that hydrated peroxides of metals, sometimes called perhydrates, may be prepared by adding an excess of hydrogen peroxide in aqueous solution to a water solution of the metal hydroxide, from which the perhydrate can be precipitated by addition of a large quantity of alcohol. (Vide: De Forcrand, Comp. rend. 130; 1465 (1900); 137:704 (1907)). An anhydrous form may then be obtained by careful and slow dehydration. This method is not suitable for commercial purposes, however, because the perhydrate is very unstable, its dehydration is a laborious and expensive operation, and is apt to be attended with reduction to the monoxide. The yields obtained by this method are also disappointingly low. The reaction may be expressed thus:

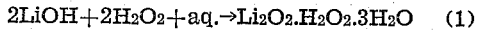

$$2\text{LiOH} + 2\text{H}_2\text{O}_2 + \text{aq.} \rightarrow \text{Li}_2\text{O}_2.\text{H}_2\text{O}_2.3\text{H}_2\text{O} \quad (1)$$

Anhydrous lithium peroxide contains but slightly less than thirty five per cent of available oxygen. The product made according to the present invention is so stable that it may be handled or stored without difficulty; and accordingly it is attractive for many uses where an oxygen-liberating compound is required. The present invention provides a method whereby anhydrous lithium peroxide may be easily and inexpensively made.

I have discovered that the anhydrous peroxide may be formed directly, and without recourse to the previously-employed dehydration procedure, by conducting a reaction in the presence of an organic liquid, followed by simple distillation of the mixture. The water present, either that introduced as a solvent or formed in the course of the reaction, is thereby eliminated from the system, and the anhydrous peroxide is obtained in good yield and with high purity. In lieu of the hydroxide, it is also possible to start with some other lithoxy-compound, such as an alcoholate.

In general, the process of the present invention contemplates the formation of the anhydrous peroxide by a reaction between the hydroxide of the metal and hydrogen peroxide, but differs from the known method in that the aqueous solution is eliminated by adding a suitable organic liquid to the mixture, and subjecting the resulting material to distillation. Inasmuch as the mixture of water and organic material distills to yield both water and organic liquid in the distillate, the water may therefore be removed from the peroxide. The organic liquid and the water may form a solution having a constant boiling point, and yielding predetermined percentages of both water and organic liquid in the distillate. If such a constant boiling point mixture is not formed in the reaction zone, as frequently may be the case, the desired results may still be obtained by making such adjustments as the situation requires. By so removing the water, as compared to precipitating the hydrated compounds and subsequently dehydrating, the yields and purities are both increased, and the costs of operation are materially reduced.

I have also discovered that the reaction between the hydroxy-compound and the hydrogen peroxide may also be conducted in a heterogeneous mixture, rather than in true solution. Here, the solid lithium compound may be suspended in a suitable liquid, and the process conducted as previously outlined. The water then to be eliminated consists essentially of that formed in the reaction, plus that introduced with the hydrogen peroxide. As the total water volume is quite small, its removal is a correspondingly simplified matter.

I have also discovered that, by introducing the organic liquid, and preferably one in which the resulting peroxide is insoluble, a condition is established under which the lithium peroxide does not decompose, or otherwise become lost. The organic liquid, of course, reduces in a sense the percentage of water in the entire mixture. A specific numerical value for the amount of water which can be tolerated cannot readily be given for all cases, inasmuch as this will vary, to a large extent, with the nature of the organic liquid selected. It may be said, however, that the percentage of water in the entire liquid should not exceed that which occurs in the vapors distilled from the same mixture. Preferably, it should be somewhat less, as the following examples will indicate.

A substantial number of organic liquids may be employed in conducting the present process.

Generally speaking, they comprise those which will not decompose the peroxide, and which also tend to form constant boiling point mixtures with water. These so-called azeotropic mixtures produce, upon distillation, a vapor having relatively fixed percentages of the constituents of the boiling mixed liquid itself. Many are tabulated in standard works, such as Young's "Distillation Principles and Processes," 1922, page 49 et seq., to which reference may be made for a further understanding of the phenomena involved. It is best, however, to select as the organic liquid one which, upon distillation, will deliver a substantial amount of water to the condensate. Thus, ethyl alcohol and water yields only 4.43% of water to the distillate, and it has been found that in this instance the yield of the peroxide may be lower than desired.

Practical considerations therefore lead to the adoption of such organic liquids as n-propanol, forming with water a mixture whose distillate contains 28% water; allyl alcohol, which also yields 28% in the vapor; pyridine, whose mixed vapor contains 43% water, and the like. Ternary mixtures, such as water-propanol-diethyl ketone, whose distillate contains 20% water, may also be employed. Further suitable mixtures will be given in the following examples, while others will suggest themselves from the literature cited. As with the case of the permissible water content of the mixture, it cannot be said strictly that the mixture must be such as to give any mathematical minimum of the water content of the distillate, the object is to get the water out of the reaction zone and thereby away from the peroxide. Obviously, if a lot of water is present, the higher the water content that can be sent over as vapor, other things being equal, the more simplified and efficient will be the operation of the process. When the residual organic liquid in the reaction vessel is one which is not a solvent for the peroxide, recovery is additionally facilitated by simple steps of decantation or filtering and drying.

It should moreover be pointed out that while reference has just been made to azeotropic mixtures of water with organic liquids, it is not essential, in all cases, to provide a mixture which, upon boiling, yields a vapor of unvarying composition or whose boiling point is absolutely constant. One of the principles which is utilized in this invention is concerned with the removal of the water from the reaction, so that the anhydrous peroxide is formed in preference to the perhydrate. When the mixture is such that, upon distillation, the water content is depleted at a suitable rate, leaving as a residue the peroxide and more or less of the organic liquid itself, then that principle may be applied in a practical way. The expression, "azeotropic mixture," lends itself most readily for descriptive purposes, and accordingly it will be employed here, without intending to restrict the invention thereby in such fashion as to exclude those variations in vapor composition or distillation temperature range which do not interfere with the desired results.

In contradistinction to the expression given for the previously known reaction, as stated by Equation 1, the overall action for the present invention may be expressed:

$$2LiOH + H_2O_2 (+aq.) = Li_2O_2 + 2H_2O + aq. \quad (2)$$

Water therefore may be introduced into the reaction zone in any one or all of the following ways: first, as a solvent for the lithium compound; second, as the solvent for the hydrogen peroxide, wherein it may constitute seventy or more per cent of the volume added; and, third, as the water produced in the course of the reaction. This last named quantity represents two moles for each mole of the peroxide to be formed, and accordingly it can be calculated as to total quantity in advance. Likewise, as the formation of such water proceeds at the same rate as the formation of the anhydrous peroxide, its rate of removal is also known.

Added to this quantity of water will be that introduced with the solution of hydrogen peroxide, together with such additional quantities of water as may be employed to take the lithium hydroxide into solution, and finally, such smaller amounts of water as may be present as a diluent or impurity in the organic liquid selected. From these figures, it is now a simple matter to determine the quantity of organic liquid required, which, when added to the foregoing water volume, will provide a mixture that can be so distilled as to discharge the water from the peroxide. The precise amount of organic liquid will, of course, vary with the nature of the liquid itself.

As a typical example, which will illustrate the fundamentals involved for any quantity of liquid mixture, Equation 2 shows that 100 grams of LiOH require, for complete reaction, the addition of 71 grams of $H_2O_2$, which, in the usual 28–30% concentrations, will be dissolved in approximately 183 grams of water. A strong (12%) solution of 100 grams of LiOH will add 840 grams of water, and the water produced by the reaction will introduce approximately another 38 grams. Therefore a total quantity of 1061 grams of water must be dealt with. If the organic liquid selected is commercial propanol, the distilled vapor will contain about 28% of water and 72% of propanol. Hence approximately 3800 grams of this liquid will be required, or in volume something less than five liters. Five liters may therefore be added as a round figure and one which is on the safe side.

In one operation of the process, the foregoing method of predicting the amounts of ingredients to be used was checked within an extremely close limit of observational error, the density of the water-propanol distillate indicated that 1420 c. c. of water had come over, while the amount taken into account before the reaction was 1400 c. c. without allowance for the small amounts of water included in the commercial propanol used.

The lithium hydroxide may be introduced into a distilling flask, the hydrogen peroxide added in suitable increments, and also the propanol in such quantities that it is always in excess with respect to the water present. Distillation is effected through a rectification column of any good design, and, when the temperature of distillation rises to say 94–95° C., or just below the boiling point of the pure propanol, it can safely be concluded that the water is substantially removed from the system. The precipitated or insoluble lithium peroxide may then be collected on a filter, washed, and dried.

No more than normal precautions need be taken insofar as the still is concerned. The rectification column and condenser should, of course, be of such design as to maintain a proper composition of the distillate, and of such size as to provide for a suitable rate of distillation. Metals and other materials tending to decompose the product should, of course, be kept out of the reaction zone. It is better to have some excess of the organic liquid present, to remain in the still after the water has been removed. Such excess will serve to safeguard against overheating of the peroxide, and thereby any tendency toward decomposition.

Another example will serve to illustrate further the principles of the invention. Lithium methylate ($LiOCH_3$), 0.227 gram moles, were dissolved in 100 c. c. of methanol, and mixed with 12 c. c. of 28–30% commercial hydrogen peroxide. The mixture was poured into a distilling flask with 100 c. c. of isoamyl alcohol (3 methyl, 1 butanol, boiling point 130.5° C.) and distillation was continued until the vapor above the liquid reached a temperature of 125° C. The resulting lithium peroxide was recovered from the residual liquid in the flask, by filtration and drying under vacuum, as a sandy yellowish powder, and in an amount of 5.1 grams. It contained 34.2% available oxygen, corresponding to an $Li_2O_2$ content of 98%, for a yield of 95.5%. It will be seen that, in this case, a ternary mixture was distilled, and that the water came from the hydrogen peroxide solution and the reaction itself.

In another instance, 6.0 grams of lithium hydroxide were dissolved in 50 c. c. of water and mixed with 14 c. c. of 28–29% hydrogen peroxide solution. Half the mixture was added to 300 c. c. of n-propanol in the distilling flask, and the mixture was distilled through a rectifying column until 120 c. c. of condensate were collected in the receiver. The remaining portion of the mixture was then added and the distillation continued to an end point of 94.5° C. The residual lithium peroxide was separated from the still liquid by filtration and washing, and recovered in the amount of 5.51 grams, equivalent to a yield of 95.8%. Analyses for the available oxygen showed 34.8% and 34.9%, indicating a practically pure material.

Another quantity was prepared by dissolving 3 grams of lithium hydroxide in 25 c. c. of water, and mixing the solution with 7 c. c. of 28–29% hydrogen peroxide solution. This mixture was stirred into 300 c. c. of n-propanol and 320 c. c. of benzene, and 500 c. c. of the mixed solution were placed in the still. At an end point of 93.5° C., the residue in the flask consisted of approximately 155 c. c. of absolute propanol, together with 2.75 grams of lithium peroxide. The solids upon analysis showed 2.4% of LiOH and 33.9% available oxygen, the recovery therefore being 93% on the basis of pure $Li_2O_2$.

In another operation of the process, 19.8 grams of lithium hydroxide were ground to a powder with mortar and pestle under a protective layer of propanol. The slurry was further diluted to increase the propanol volume to 340 c. c. and was then introduced into the reaction flask and chilled to −2° C. The purpose of cooling the slurry was to safeguard the subsequently added hydrogen peroxide from decomposition without reaction with lithium hydroxide. 54 c. c. of 30% hydrogen peroxide solution were then added, drop by drop, and stirred into the slurry. The dropping funnel was washed with an additional 20 c. c. of propanol in order to remove from it all of the hydrogen peroxide. The mixture was then stirred at freezing temperature for an additional two hours, and then subjected to distillation until 320 c. c. of liquid were collected in the condensing flask. The vapor above the boiling liquid increased to a final temperature of 93.1° C., at which time the distillation was discontinued. The residue in the flask was filtered and the precipitate washed with propanol and ether and dried under vacuum. 19 grams of solid were recovered, which, upon analysis, showed available oxygen of 31.8%, corresponding to a $Li_2O_2$ content of 91% and a yield of 95%.

In still another operation of the process, 336 grams of hydrated lithium hydroxide crystals ($LiOH.H_2O$), 97.5% purity, were placed in the flask with 3 liters of n-propanol and to this were added 416 c. c. of a 27 to 20% aqueous solution of hydrogen peroxide. The mixture was stirred in the cold for three hours and thereafter subjected to distillation over an oil bath. After about 2 liters of liquid had been distilled, which occurred in about one hour, 50 c. c. of aqueous hydrogen peroxide and 500 c. c. of propanol were added to the flask and the distillation was continued for another hour to a temperature of 95° C. at the bottom of the rectification column. The distillation was then interrupted and the separated lithium peroxide was filtered and washed with propanol and ether. The product was dried in a desiccator with vacuum and allowed to stand over night over phosphorus pentoxide. The dried material was recovered in an amount of 173.5 grams for a yield of 93.5%, and it showed upon analysis a $Li_2O_2$ content of 97.2% and active oxygen of 33.9%.

It will be noted from this example that it was not necessary to reduce the lithium hydroxide to the form of a finely divided powder nor to dissolve it in water, and that there was employed the comparatively cheap hydrated form of hydroxide rather than the more expensive anhydrous hydroxide. The time required for the entire operation is also much less than that utilized by previously known methods, thus indicating that anhydrous lithium peroxide may now be made readily and in commercial quantities.

While it is deemed the better practice to continue the distillation until all of the water is eliminated from the reaction chamber, it is nevertheless possible to prepare the peroxide in fair yield and with good purity without extracting the full amount of water present. This was demonstrated by the following experiment. Equal molar amounts of powdered anhydrous lithium hydroxide and 30% hydrogen peroxide were admixed with such an excess of absolute propanol that the total water amounted to only five per cent of the liquid mixture. Distillation was then conducted for three hours, but with a reflux condenser, so that the azeotropic vapor was returned to the reaction flask, rather than being removed therefrom. It appears that, when the water is present in such relatively small amounts, the propanol acts as an acceptor for it preferentially to the peroxide to be formed. Thus, the precipitate of lithium peroxide was found to be essentially anhydrous, although under the conditions just described a few crystals of perhydrate remained on the wall of the flask.

It should be understood that the hydrated peroxide may also be formed according to de Forcrand's original method, separated from the excess water and then subjected to azeotropic distillation as a separate step. However, this alternative procedure tends to reduce the yield, due to the solubility of the lithium peroxide in the water, and accordingly the procedure previously described is preferred. Moreover, it is to be noted from Equations 1 and 2 that the earlier method requires twice as much hydrogen peroxide. It will also be obvious that the principles herein set forth are adaptable to the production of other peroxides which are stable under the conditions of operations.

It should be noted that anhydrous lithium peroxide as prepared according to the present invention is soluble in water, but does not tend to decompose rapidly as is the case of the hydrated peroxide. Accordingly, for some purposes it is desirable to admix with the anhydrous lithium peroxide a suitable catalytic agent which will accelerate the liberation of oxygen under hydrolytic conditions, but which will not break down the peroxide under normal conditions of storage. For this purpose, I propose to admix with the anhydrous lithium peroxide a small quantity of a suitable catalytic agent such as manganese sulphate. The catalytic action may be attributed to the fact that the manganese atom is capable of several valences, and the same may be said in regard to a catalytic agent containing an iron ion. The amount of catalytic agent so added may be very small, being from less than 0.1% up to 0.2%. Additional amounts apparently serve no beneficial purpose. Such a composition of matter may be readily prepared and stored without deterioration, as the mixture has the same stability in the dry state as the pure peroxide itself.

It may be further noted that the catalytic agent is so active that the oxygen will be released from the peroxide in water solution, even at temperatures as low as 0° C. or less.

While the invention has been described with respect to procedures which have been tried and found to be practical, it will of course be understood that it is not restricted to this specific examples given, but is susceptible of numerous variations and modifications without departure from its principles. Accordingly, it is intended that the invention should be considered to have a scope commensurate with the context of the following claims.

I claim:

1. In the production of lithium peroxide by reaction between hydrogen peroxide and a lithoxy-compound, the step which comprises admixing the lithium peroxide with an organic liquid and subjecting the resulting mixture to distillation to eliminate the water therefrom, thereby to form a substantially anhydrous lithium peroxide.

2. In the production of lithium peroxide by reaction between hydrogen peroxide and a lithoxy-compound, the steps which comprise reacting the lithoxy-compound with hydrogen peroxide, thereby to form a mixture including combined or free water, adding an organic liquid to the mixture, said organic liquid being such as to form an "azeotropic" solution with said water, and subjecting the resulting mixture to distillation to eliminate said water and thereby yield a substantially anhydrous lithium peroxide.

3. In the production of lithium peroxide by reaction between hydrogen peroxide and a lithoxy-compound, the step which comprises adding an organic liquid capable of forming an "azeotropic" mixture with the water present with the lithium peroxide, and subjecting the mixture to distillation to eliminate the water and thereby to yield a substantially anhydrous peroxide.

4. The method of converting lithium perhydrate to anhydrous peroxide which comprises admixing the perhydrate with an organic liquid non-reactive with the perhydrate and peroxide and capable of forming an "azeotropic" mixture with water, and subjecting the resulting mixture to distillation, thereby to eliminate the water with a portion of the organic liquid, and convert the perhydrate to anhydrous form.

5. The method of forming anhydrous lithium peroxide which comprises admixing a lithoxy-compound with hydrogen peroxide, adding to the perhydrate resulting from the reaction a quantity of organic liquid forming with water a mixture from which both water and the liquid may be distilled, distilling the mixture until the water has been expelled as distillate, and recovering the solid anhydrous lithium peroxide, the quantity of organic liquid so added being such as to decrease the ratio of water to liquid in the presence of the solid peroxide as the distillation proceeds.

6. The method of forming anhydrous lithium peroxide by interaction of a lithoxy-compound and hydrogen peroxide which comprises adding to the perhydrate resulting from the reaction an organic liquid which does not decompose the lithium peroxide, the amount of liquid so added being such that, upon distillation, an "azeotropic" distillate is formed and the water present with the lithium peroxide is progressively depleted, and subjecting the mixture to distillation until the water is driven off.

7. The method of forming anhydrous lithium peroxide stable under normal conditions of storage which comprises reacting a lithoxy-compound with hydrogen peroxide, treating the resulting material with an organic liquid tending to form an "azeotropic" mixture with water, the amount of organic liquid being in excess of that required to form such "azeotropic" mixture in the liquid phase, subjecting the mixture to distillation to remove the water and form a residue of anhydrous lithium peroxide and some of the organic liquid, separating the residual organic liquid from the lithium peroxide and recovering said peroxide.

8. A method of making anhydrous lithium peroxide which comprises reacting a lithoxy-compound with aqueous hydrogen peroxide in substantially stoichiometric proportions, adding n-propanol in a quantity in excess of that required to form an azeotropic mixture with the water present, distilling the mixture until such water is driven off, and separating the residual anhydrous lithium peroxide from the residual propanol.

9. A method of making anhydrous lithium peroxide which comprises reacting a solid lithoxy-compound with hydrogen peroxide in an organic liquid, said liquid being capable of forming an "azeotropic" mixture with the water formed by the reaction, and distilling the mixture to eliminate the water.

10. In a method of making anhydrous lithium peroxide by reaction between a lithoxy-compound and hydrogen peroxide, the steps which comprise adding the lithoxy-compound to the reaction zone in the solid phase, adding to the reaction zone an organic liquid in which the lithium peroxide is insoluble, and subsequently separating the water and liquid from the lithium peroxide.

11. In the production of anhydrous lithium peroxide by reaction between a lithoxy-compound and hydrogen peroxide, the steps comprising admixing the lithoxy-compound in the solid phase with the hydrogen peroxide, thereby to minimize the amount of water present in the system, adding an organic liquid capable of forming an "azeotropic" mixture with water formed by the reaction, heating the mixture, and subsequently separating the water and liquid from the lithium peroxide.

12. In the method of claim 11, limiting the amount of hydrogen peroxide to substantially one-half mole per mole of lithoxy-compound, and adding an excess of the organic liquid over that required to form an azeotropic distillate.

13. In the preparation of lithium peroxide, the steps which comprise reacting a solid lithoxy-compound with hydrogen peroxide, and maintaining in contact with the said solid lithoxy-compound and the resulting lithium peroxide a quantity of water less than that required to dissolve either the said lithoxy-compound or the resulting peroxide.

PAUL F. WINTERNITZ.

REFERENCES CITED

The following references are of record in the file of this patent:

UNITED STATES PATENTS

| Number | Name | Date |
| --- | --- | --- |
| 1,939,708 | Larson | Dec. 14, 1933 |
| 2,215,856 | Pfleiderer | Sept. 24, 1940 |